United States Patent
Huo et al.

(10) Patent No.: US 8,517,945 B2
(45) Date of Patent: Aug. 27, 2013

(54) SEGMENTATION OF LESIONS IN ULTRASOUND IMAGES

(75) Inventors: Zhimin Huo, Pittsford, NY (US); Xu Liu, Shanghai (CN)

(73) Assignee: Carestream Health, Inc., Rochester, NY (US)

( * ) Notice: Subject to any disclaimer, the term of this patent is extended or adjusted under 35 U.S.C. 154(b) by 1612 days.

(21) Appl. No.: 11/414,759

(22) Filed: Apr. 28, 2006

(65) Prior Publication Data

US 2006/0247525 A1 Nov. 2, 2006

Related U.S. Application Data

(60) Provisional application No. 60/675,629, filed on Apr. 28, 2005.

(51) Int. Cl.
*A61B 8/00* (2006.01)

(52) U.S. Cl.
USPC ........... 600/443; 600/407; 600/437; 382/171; 382/177; 382/195; 382/260

(58) Field of Classification Search
USPC ............... 600/443, 437, 407; 382/176–178, 382/190, 199, 170–173
See application file for complete search history.

(56) References Cited

U.S. PATENT DOCUMENTS

| | | | |
|---|---|---|---|
| 5,984,870 A | | 11/1999 | Giger et al. |
| 6,138,045 A | * | 10/2000 | Kupinski et al. ............... 600/425 |
| 6,185,320 B1 | | 2/2001 | Bick et al. |
| 6,855,114 B2 | | 2/2005 | Drukker et al. |
| 2003/0125621 A1 | | 7/2003 | Drukker et al. |
| 2003/0161513 A1 | | 8/2003 | Drukker et al. |

OTHER PUBLICATIONS

Madabhushi et al (Combining Low, High Level and Empirical Domain Knowledge for Automated Segmentation of Ultrasonic Breast Lesions).*
Shi et al (Normalized cuts and image segmentation).*
A. Madabhushi et al., Combining Low-, High Level and Empirical Domain Knowledge for Automated Segmentaton of Ultrasonic Breast Lesions, IEEE Transactions on Medical Imaging, vol. 22, No. 2, Feb. 2003, pp. 155-169.
F. M. Hall et al., Nonpalpable Breast Lesions: Recommendations for Biopsy Based on Suspicion of Carcinoma at Mammography, Radiology 1988, 167, pp. 353-358.
C. J. D'Orsi et al., Reading and Decision Aids for Improved Accuracy and Standardization of Mammographic Diagnosis, Radiology 1992; 184, pp. 619-622.
D. B. Kopans, Breast Imaging—The Positive Predictive Valve of Mammography, Lippincott Williams & Wilkins; 2nd edition, Jan. 1998, ISBN 039751302X.
L. W. Bassett et al., Breast Cancer Detection: Mammography and Other Methods in Breast Imaging, Grune & Stratton, Inc., 1987, ISBN 0-8089-1842-7.

(Continued)

*Primary Examiner* — Tse Chen
*Assistant Examiner* — Joel F Brutus (57) ABSTRACT

A method for determining a candidate lesion region in a digital ultrasound medical image of anatomical tissue. The method includes the steps of: accessing the digital ultrasound medical image of anatomical tissue; applying an anisotropic diffusion filter to the ultrasound image to generate a filtered ultrasound image; performing a normalized cut operation on the filtered ultrasound image to partition the filtered ultrasound image into a plurality of regions; and selecting, from the plurality of regions, at least one region as a candidate lesion region.

12 Claims, 5 Drawing Sheets

(56) References Cited

OTHER PUBLICATIONS

S. L. Parker et al., Cancer Statistics, 1997, CA Cancer Clinic 1997, vol. 47, No. 1, Jan./Feb. 1997, pp. 5-27.
E. A Sickles, Periodic Mammographic Follow-up of Probably Benign Lesions: Results in 3,184 Consecutive Cases, Radiology, vol. 179, No. 2, May 1991, pp. 463-468.
R. J. McKenna, The Abnormal Mammogram Radiographic Findings, Diagnostic Options, Pathology, and Stage of Cancer Diagnosis, Cancer Supplement, Vol, 74, No. 1, Jul. 1, 1994, pp. 244-255.
D. B. Kopans, The Positive Predictive Value of Mammography, American J. Roentgen, No. 158, Mar. 1992, pp. 521-526.
C. J. D'Orsi et al., Mammographic Feature Analysis, Seminars in Roentgenology, vol. 28, No. 3, Jul. 1993, pp. 204-230.
P. Perona et al., Scale-Space and Edge Detection Using Anisotropic Diffusion, IEEE Transactions on Pattern Analysis and machine Intelligent, Vo. 12, No. 7, Jul. 1990, pp. 629-639.
J. Shi et al., Normalized Cuts and Image Segmentation, IEEE Transactions on Pattern Analysis and Machine Intelligence, vol. 22, No. 8, Aug. 2000, 888-905.
K. Horsch et al., Automatic Segmentation of Breast Lesions on Ultrasound, Med. Phys., 28 (8), Aug. 2001, pp. 1652-1657.

\* cited by examiner

Figure 3:
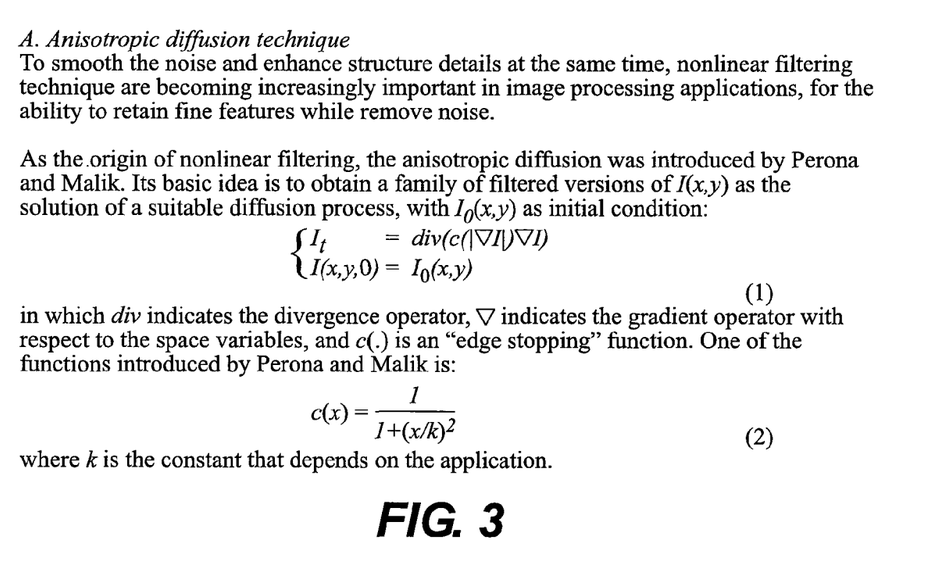
FIG. 3 generally describes an anisotropic filter technique.

*A. Anisotropic diffusion technique*

To smooth the noise and enhance structure details at the same time, nonlinear filtering technique are becoming increasingly important in image processing applications, for the ability to retain fine features while remove noise.

As the origin of nonlinear filtering, the anisotropic diffusion was introduced by Perona and Malik. Its basic idea is to obtain a family of filtered versions of $I(x,y)$ as the solution of a suitable diffusion process, with $I_0(x,y)$ as initial condition:

$$\begin{cases} I_t = div(c(|\nabla I|)\nabla I) \\ I(x,y,0) = I_0(x,y) \end{cases} \quad (1)$$

in which *div* indicates the divergence operator, $\nabla$ indicates the gradient operator with respect to the space variables, and $c(.)$ is an "edge stopping" function. One of the functions introduced by Perona and Malik is:

$$c(x) = \frac{1}{1+(x/k)^2} \quad (2)$$

where $k$ is the constant that depends on the application.

SEGMENTATION OF LESIONS IN ULTRASOUND IMAGES

CROSS REFERENCE TO RELATED APPLICATIONS

Reference is made to, and priority is claimed from, commonly assigned Provisional Patent Application U.S. Ser. No. 60/675,629, entitled "SYSTEMS AND METHODS FOR AUTOMATED ANALYSIS OF LESIONS ON ULTRASOUND IMAGES", filed on Apr. 28, 2005 in the names of Huo et al., and which is incorporated herein by reference.

FIELD OF THE INVENTION

The invention relates to digital image processing of ultrasound images, and more particularly to detecting lesions within such images.

BACKGROUND OF THE INVENTION

Breast cancer is a common cancer of women and a common cause of cancer deaths. An effective way to improve prognosis and survival rate is early detection and treatment of breast cancer. Mammography is an imaging modality which has provided some effectiveness in the early detection of clinically occult breast cancer, and is viewed by some to be a primary imaging modality for breast cancer screening.

Mammography combined with ultrasound (sonography) examination is considered by some to be an effective method for early diagnosis of breast cancers. As an adjunct to mammography for breast cancer detection and diagnosis, ultrasound can be used to determine whether a detected mass from screening mammography is solid or cystic. The characteristics of the lesion extracted from ultrasound images could also assist in differentiating between benign and malignant lesions. Refer for example to A T Stavros et al., "Solid Breast Nodules: Use Of Sonography To Distinguish Between Benign And Malignant Lesions", Radiology, Vol. 196, pp. 123-134, 1995. See also Parker S L, Tong T, Bolden S and Wingo P A. Cancer Statistics. Ca Cancer J Clin 1997; 47:5-27.

Currently, mammography is believed to achieve a reported sensitivity (i.e., a fraction of breast cancers that are detected by mammography) of 85%-95%. Despite improved radiographic criteria for differentiating malignant from benign lesions of the breast, misclassification of lesions can occur in everyday clinical practice. Refer to the following references.

Anant Madabhushi et al, "Combining low-, high-level and empirical domain knowledge for automated segmentation of ultrasound breast images", IEEE Transactions on Medical Imaging, Vol. 22, No. 2, pp 155-169, February 2003.

Segyeony Joo et al, "Computer-aided diagnosis of solid breast nodules: use of an artificial neural network based on multiple sonographic features", IEEE Transactions on Medical Imaging, Vol. 23, No. 10, pp. 1292-1300, October 2004.

A. Hammoude, "An Empirical Parameter Selection Method for Endocardial Border Identification Algorithm", Computerized Medical Imaging and Graphics, Vol. 25, pp. 33-45, 2001.

Bassett L W and Gold R H. Breast Cancer Detection: Mammography and Other Methods in Breast Imaging. New York, Grune & Stratton, 1987.

D'Orsi C J and Kopans D B. Mammographic feature analysis. Seminars in Roentgenology 1993; 28:204-230.

D'Orsi C J, Swets J A, Pickett R M, Seltzer S E and McNeil B J. Reading and decision aids for improved accuracy and standardization of mammographic diagnosis. Radiology 1992; 184:619-622.

Knutzen A M and Grisvold J J. Likelihood of malignant disease for various categories of mammographically detected, nonpalpable breast lesions. Mayo Clin Proc 1993; 68:454-460.

Sickles E A. Periodic mammographic follow-up of probably benign lesions: results in 3184 consecutive cases. Radiology 1991; 179:463-468.

Kopans D B. Breast Imaging. Philadelphia, Lipincott, 1989.

It has been estimated that only 15-30% of mammographic lesions sent to biopsy are actually malignant. Variability (estimated as 7% to 40%) in positive biopsy rates between individual radiologists has also been reported. Thus, use of ultrasound images adjunct to mammography is believed to be increasingly important to reduce the number of benign cases sent for unnecessary biopsy.

In addition, there is a need for an objective computerized classification scheme adapted to differentiate between benign and malignant masses at the level similar to experienced radiologists to promote improvement in the diagnostic accuracy of less-experienced radiologists, to further promote the reduction in the number of unnecessary biopsies for benign lesions.

U.S. Pat. No. 5,984,870 (Giger) is directed to a method and system for the analysis of a lesion existing in anatomical tissue.

U.S. Patent Application No. 2003/0161513 (Drukker) is directed to the analysis of lesion shadows in an ultrasound image.

U.S. Pat. No. 6,855,114 (Drukker) is directed to a radial gradient index (RGI) feature in a sonographic image.

A difficulty which has been associated with a computerized system for detecting and diagnosing breast lesions is the segmentation of the lesion regions from the surrounding tissues. In some systems, the segmentation is accomplished by manually outlining the lesions using a graphic user interface, for example, U.S. Pat. No. 5,984,870 (Giger). This manual procedure is labor-intensive, can disrupt full automation, and can be prone to human error, inconsistency, and subjectivity.

Accordingly, there exists a need for an automated segmentation module for a computerized mammography analysis system. Accurate segmentation of a breast lesion is an important step to ensure accurate classification of a detected breast lesion as a benign or malignant lesion. Further, automated segmentation of breast lesions in ultrasound images can improve the workflow by removing the manual segmentation step.

Several approaches have been proposed to segment ultrasound breast images for automated diagnosis of breast lesions. See for example, Madabhushi and Metaxas, "Combining low-, high-level and empirical domain knowledge for automated segmentation of ultrasound breast images," IEEE Trans. on Medical Imaging, Vol. 22, No. 2, February 2003, pp. 155-169; and Horsch K, Giger M L, Venta L A and Vyborney C J., "Automatic segmentation of breast lesions on ultrasound images", Med Phys 2001; 28:1652-1659.

Given that ultrasound images comprise speckle noise and tissue related textures, accurate segmentation task remains as a challenge.

Pixel-based, edge-based, region-based, and model-based segmentation techniques are known in medical image processing. Some approaches may have limitations. For example, pixel-based segmentation techniques tend to have difficulties when there is a significant amount of noise in the image. Edge-based techniques tend to experience problems when the boundary of the object is not well defined and when the image contrast is poor. Model-based techniques tend to fail when there is a significant amount of variation in the shape and appearance of the object of interest. Region-growing techniques require a good seed point (typically provided by manual interaction) and can be subject to errors when adjoining objects closely match an object of interest in their appearance. U.S. Patent Application No. 2003/0125621 (Drukker) describes gradient features and region growing methods to segment breast lesions in ultrasound images.

Accordingly, there exists a need for a method, which overcomes the limitations of existing methods.

Reference is made to commonly assigned application U.S. Ser. No. 10/994,794, entitled "DETECTING AND CLASSIFYING LESIONS IN ULTRASOUND IMAGES", filed on Nov. 22, 2004 in the names of Luo et al., and which is incorporated herein by reference. The Luo et al application describes a method for detecting a lesion in a digital ultrasound image of anatomical tissue, the method comprising the steps of accessing the digital ultrasound image of anatomical tissue; segmenting spatially contiguous pixels in the digital image into a plurality of regions in accordance with substantially similar intensity patterns; selecting, from the plurality of regions, one or more candidate lesion regions having an intensity value lower than a pre-determined intensity value; and classifying the one or more candidate lesion regions into at least one of the following classes: benign, malignant, or unknown.

The present invention provides a lesion detection and segmentation wherein detection and segmentation are automatic. The method examines the similarity and dissimilarity in intensity and texture patterns of regions and identifies regions as potential candidates for breast lesions. Thus, the method is less sensitive to the noise and target appearance.

SUMMARY OF THE INVENTION

An object of the present invention is to provide a lesion detection method in which the detection is automatic.

Another object of the present invention is to provide such a lesion segmentation method in which is relatively insensitive to variations in image noise and target appearance.

A further object of the present invention is to provide such a method to remove speckle noise to promote accurate segmentation of a lesion for extracting features used by human readers or by a computer classification method.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

The present invention provides a method, computer program, and system, in which a lesion region is automatically located within an ultrasound image. It is an advantageous effect of the invention that an improved lesion diagnosis method and apparatus are provided, in which segmentation is automatic and is relatively insensitive to in image noise.

According to one aspect of the present invention, there is provided a method for determining a candidate lesion region in a digital ultrasound medical image of anatomical tissue. The method includes the steps of: accessing the digital ultrasound medical image of anatomical tissue; applying an anisotropic diffusion filter to the ultrasound image to generate a filtered ultrasound image; performing a normalized cut operation on the filtered ultrasound image to partition the filtered ultrasound image into a plurality of regions; and selecting, from the plurality of regions, at least one region as a candidate lesion region.

According to another aspect of the present invention, there is provided a method for determining a candidate lesion region in a digital ultrasound medical image of anatomical tissue. The method includes the steps of: (1) accessing the digital ultrasound medical image of anatomical tissue; (2) applying an anisotropic diffusion filter to the ultrasound image to generate a filtered ultrasound image; (3) performing a normalized cut operation on the filtered ultrasound image to partition the filtered ultrasound image into a plurality of regions, wherein the normalized cut is performed by segmenting spatially contiguous pixels in the filtered ultrasound image into a plurality of regions in accordance with substantially similar features; (4) merging the plurality of regions based on pre-determined threshold values; and (5) selecting, from the plurality of regions, at least one region as a candidate lesion region, wherein the selected candidate lesion region has: (1) an intensity value lower than a pre-determined intensity value and (2) morphological or texture features in accordance with pre-determined lesion criteria.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

FIGS. 2A-2F are examples of ultrasound images wherein

FIGS. 5A-5B are ultrasound images wherein

DETAILED DESCRIPTION OF THE INVENTION

The following is a detailed description of the preferred embodiments of the invention, reference being made to the drawings in which the same reference numerals identify the same elements of structure in each of the several figures.

Figure 1:
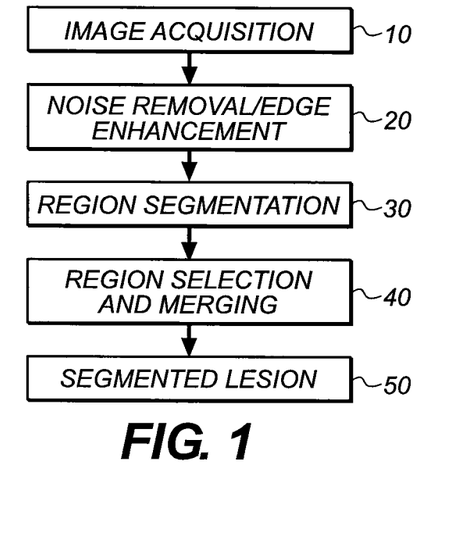
FIG. 1 is a block diagram illustrating the steps of an embodiment of the method in accordance with the present invention.

FIG. 1 shows a flowchart generally illustrating the method in accordance with the present invention. At step 10, an input ultrasound image is accessed/acquired/provided for analysis. A nonlinear filtering is applied on the input ultrasound image to remove the noise while preserving the edge (step 20). At step 30, the region is segmented. Region selection and merging is accomplished at step 40, and the lesion is segmented at step 50.

More particularly, once the digital ultrasound image of anatomical tissue is accessed, an anisotropic diffusion filter is used to remove noise from the image. Then, spatially contiguous pixels of the digital ultrasound image are segmented into a plurality of regions in accordance with substantially similar intensity values and texture features using a normalized cut method. One or more candidate lesion regions are then selected from the plurality of regions, such that the selected candidate lesion region has an intensity value lower than a pre-determined intensity value and has morphological and texture features meeting a pre-determined lesion criteria.

Figure 2A:
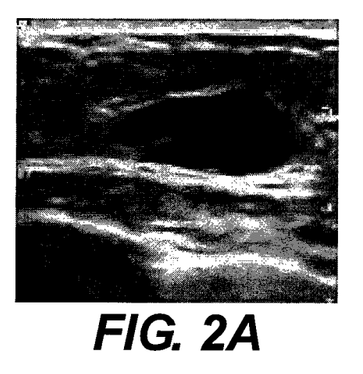
FIG. 2A shows an original image with a lesion.
Figure 2B:
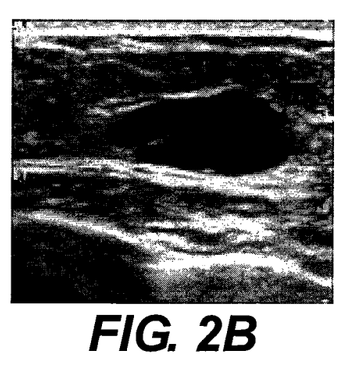
FIG. 2B shows the image after noise filtering.
Figure 2C:
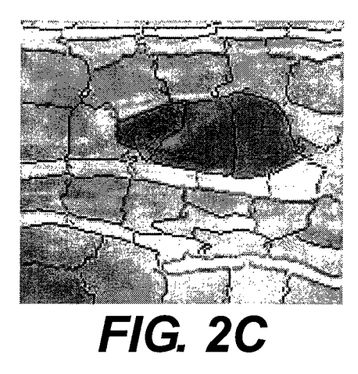
FIG. 2C shows the image obtained from a normalized cut segmentation.
Figure 2D:
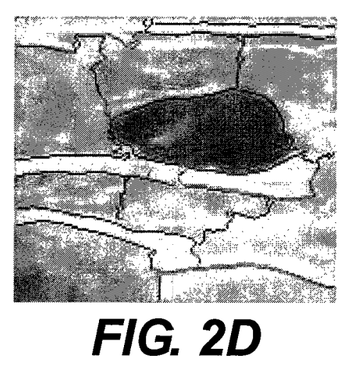
FIG. 2D shows the image after region merging.
Figure 2E:
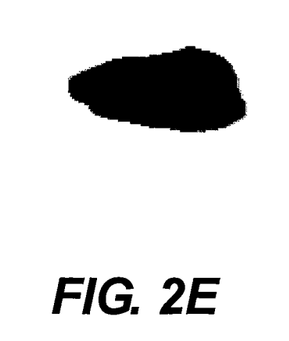
FIG. 2E shows the smoothed region after morphological operation.
Figure 2F:
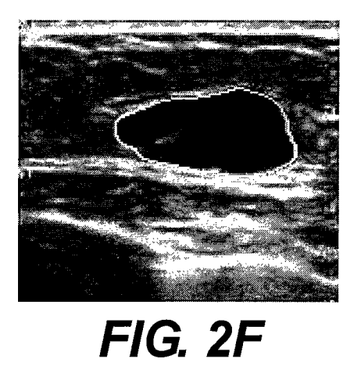
FIG. 2F shows a final segmentation result.

FIGS. 2A through 2F illustrate the method of the present invention. FIG. 2A shows an original ultrasound image of anatomical tissue with a lesion (step 10). FIG. 2B shows the image after noise filtering of step 20. FIG. 2C shows the image obtained from a normalized cut segmentation (step 30). FIG. 2D shows the image after region merging (step 40). FIG. 2E shows the smoothed region after morphological operation. FIG. 2F shows a final segmentation result (step 50).

As mentioned above, a nonlinear filter is applied to the ultrasound image at step 20 to remove noise while preserving the edge. At this step, an anisotropic diffusion is preferably used as the nonlinear filter. An advantage of such a filter is that it is adapted to smooth the noise while being able to preserve or possibly enhance edges.

Anisotropic diffusion is well known, and has been described by Perona and Malik. Refer to Perona et al, "Scale Space and Edge Detection Using Anisotropic Diffusion", IEEE Transactions on Pattern Recognition and Machine Intelligence, Vol. 12, No. 6, pp. 629-639, July 1990. Generally, with anisotropic diffusion, an "edge stopping" function is introduced to "stop" the diffusion process for pixels on edges with a strong gradient. A general description of anisotropic diffusion is provided in FIG. 3.

At step 30, a normalized cut (Ncut) is performed to partition the image into a number of groups or regions, for example as shown in FIG. 2C. Normalized cuts are known. For example, refer to Jianbo Shi et al, "Normalized Cuts and Image Segmentation", IEEE Transactions on Pattern Analysis and Machine Intelligence, Vol. 22, No. 8, pp. 888-905, August 2000. The normalized cut described by Shi et al. formulates segmentation as a graph-partitioning problem. The normalized cut is a measure of the goodness of an image partition. A criterion is to maximize the total dissimilarity between the different groups and the total similarity within the groups in an image. This segmentation technique employs combinations of different features (such as brightness, position, windowed histograms, and the like), and Applicants have recognized its use in applications of different imaging modalities.

Ncut is considered to be an unsupervised segmentation method. Consider a given image represented by G=(V,E), with nodes V (feature vector) of the graph representing points in the featured space and E representing edges between any two nodes. To partition G into two disjoint sets A and B, the dissimilarity between A and B sets is calculated as shown in Equation 1:

$$\text{cut}(A, B) = \sum_{u \in A, v \in B} w(u, v) \quad \text{(Eqn. 1)}$$

wherein w(u,v), the weight on each edge, is a function of the similarity between node u and node v. An optimal cut or partition of these nodes V into two disjunctive sets A and B can be reached when cut(A,B) reaches its minimum.

The normalized cut is calculated as in Equation 2:

$$N \text{ cut}(A, B) = \frac{\text{cut}(A, B)}{\text{asso}(A, V)} + \frac{\text{cut}(A, B)}{\text{asso}(B, V)} \quad \text{(Eqn. 2)}$$

wherein:

$$\text{asso}(A, V) = \sum_{u \in A, t \in V} w(u, t)$$

is the total connection from nodes in A to all nodes in graph V. In Ncut, cut( ) is normalized by asso( ). The normalization is performed to remove the bias for partitioning out small sets of isolated nodes in the graph when minimizing cut(A,B).

Features such as intensity-based features (e.g., average gray scale, variations in gray scale), position, windowed histograms and texture-based features are calculated for each point (node) in an image. Given a set of features, a weighted graph G=(V,E) is generated for an image. The image is partitioned into groups by minimizing Ncut, so as to minimize the similarity between groups and maximize the similarity within each group. Thus, the normalized cut is accomplished by segmenting spatially contiguous pixels in the filtered ultrasound image into a plurality of regions in accordance with substantially similar intensity-based features and/or texture-based features. A determination is then made whether the current partition should be subdivided by checking the stability of the cut, and determining if Ncut is below a pre-determined value. Recursive partitioning of the segmented parts can occur. FIG. 2C shows the result from the Ncut method. It is noted that Ncut can begin with bipartition or with n by m regions.

Regions selection and merging occurs at step 40. This clustering step includes two steps: region merging and selection of lesion region.

The texture property is characterized within each region. Texture features such as the energy, entropy, contrast and homogeneity from co-occurrence matrix are calculated for each region, as with Equation 3. These textures are selected since the texture properties for lesion regions are different than for non-lesion regions.

$$\text{Entropy} = -\sum_i \sum_j P[i, j] \log P[i, j] \quad \text{(Eqn. 3)}$$

$$\text{Energy} = -\sum_i \sum_j P^2[i, j]$$

$$\text{Contrast} = -\sum_i \sum_j (i - j)^2 P[i, j]$$

$$\text{Homogeneity} = -\sum_i \sum_j \frac{P[i, j]}{1 + |i - j|}$$

wherein P[i, j] is a two-dimensional Grey scale co-occurrence matrix.

Figure 4A:
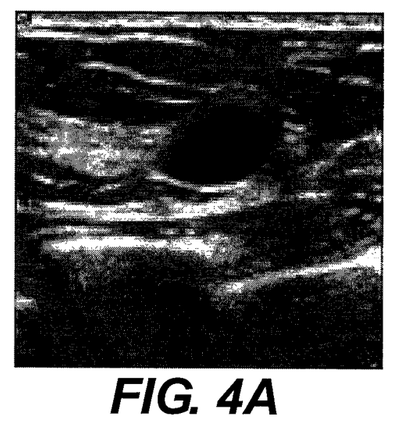
FIG. 4A-4B show examples of ultrasound images with a breast lesion.
Figure 4B:
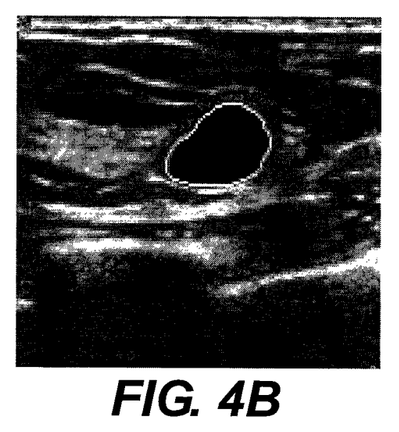

It is noted that lesion regions tend to be dark, with larger entropy and homogeneity values and a smaller contrast value as shown in FIGS. 4A and 4B. Pre-selected/pre-determined threshold values can be employed as criteria to determine if two regions should be merged.

Two sets of criteria can be employed: one for regions with an average gray value lower than a value $G_0$, and one for regions with an average gray value higher than $G_0$.

For regions with an average gray value less than $G_0$, less strict criteria are applied on the similarity in texture measures between the two adjacent regions. The difference between the two regions allowed is different for each texture feature.

For regions with an average gray value greater than $G_0$, tighter criteria are applied on the similarity in texture measures between the two adjacent regions.

FIG. 2D shows the image with merged regions based on texture analysis.

With regard to region selection, a calculation is made of the following features from each region to determine which region has a high probability to be a lesion candidate. This determination is based on factors such as size, circularity, average gray level, location, margin gradient, and the like. Based on the empirical rules of lesion size, shape, margin, and texture features typically used by radiologists to characterize a breast lesion in ultrasound image, a breast lesion tends to be round or oval in shape, and have a stronger gradient along the border or portion of the border. Lesions tend to be located around the center of an ultrasound image and with a low-average gray value than their surroundings. The ultrasound image is reviewed for the potential region in each image based on size, circularity, margin gradient, average gray value of each region and its relative position in the image. Shown in FIG. 2E is a binary image with the identified region after morphological smoothing operation to smooth the border.

Selected textures calculated in Equation 3 can be also used to more particularly identify a candidate lesion region. A rule-based classifier can be employed to analyze these features to determine the lesion candidate having a likelihood of malignancy.

Figure 5A:
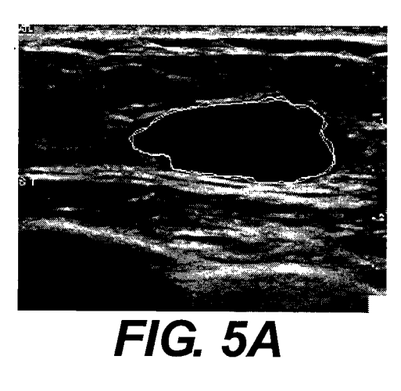
FIG. 5A shows a manually delineated lesion border and computer delineated lesion border.
Figure 5B:
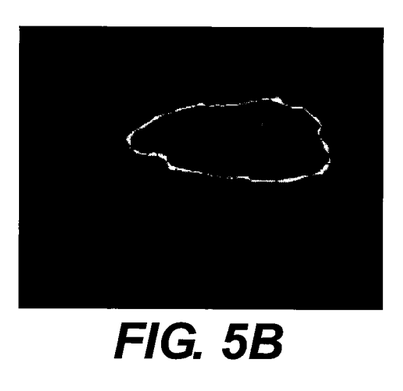
FIG. 5B shows a mismatched area between the two borders.

The method of the present invention is directed to providing a method to automate segmentation of candidate lesions. FIGS. 5A and 5B are ultrasound images wherein FIG. 5A shows a manually delineated lesion border and a computer delineated lesion border. FIG. 5B shows a mismatched area between the two borders.

Figure 6A:
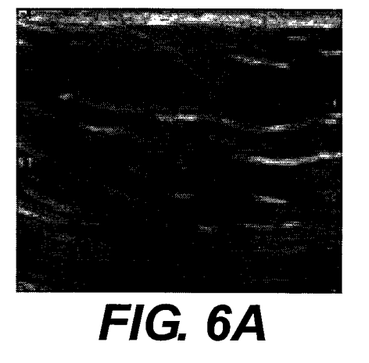
FIGS. 6A-6B, 7A-7B, and 8A-8B show examples of original ultrasound images (FIGS. 6A, 7A, and 8A) and the ultrasound image with computer-determined contours (FIGS. 6B, 7B, and 8B).
Figure 6B:
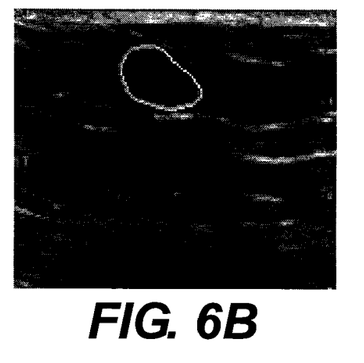
Figure 7A:
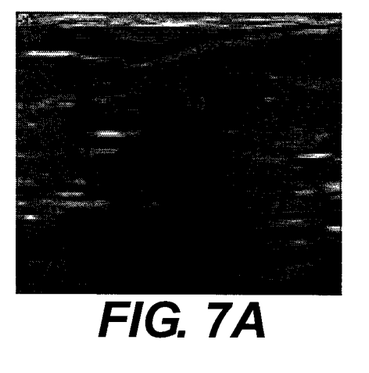
Figure 7B:
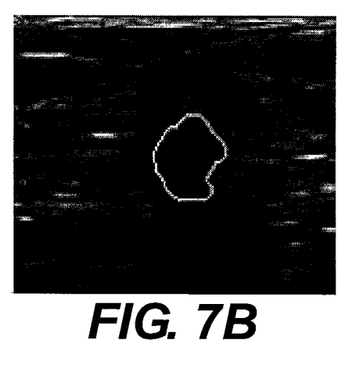
Figure 8A:
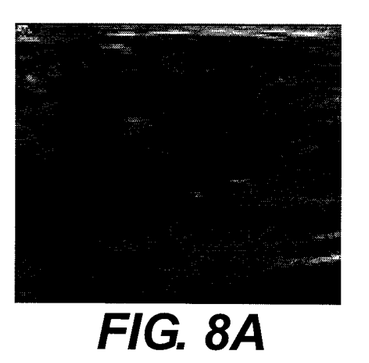
Figure 8B:
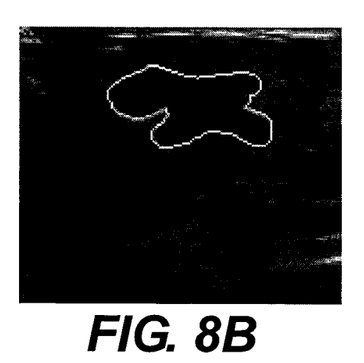

FIGS. 6A-6B, 7A-7B, and 8A-8B show examples of original ultrasound images (FIGS. 6A, 7A, and 8A) and the ultrasound image with computer-determined contours (FIGS. 6B, 7B, and 8B).

The present invention has been described with the understanding that the ultrasound image includes an lesion region. However, it is noted that the ultrasound image under review may not comprise a lesion region or may comprise a lesion region which does not satisfy the threshold defined by the user. As such, it is possible that no lesion region would be detected, and accordingly, an appropriate message or notation can be provided to the medical professional.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

All documents, patents, journal articles and other materials cited in the present application are hereby incorporated by reference.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A method for determining a candidate lesion region in a digital ultrasound medical image of anatomical tissue, the method comprising using a processor or computer to perform automatically steps of:
   accessing the digital ultrasound medical image of anatomical tissue;
   applying an anisotropic diffusion filter to the ultrasound image to generate a filtered ultrasound image;
   performing a normalized cut operation on the filtered ultrasound image to partition the filtered ultrasound image into a plurality of regions;
   merging the plurality of regions into merged regions based on predetermined threshold values; and
   selecting, from the merged regions, at least one region as a candidate lesion region.

2. The method of claim 1, wherein the selected candidate lesion region has: (1) an intensity value lower than a pre-determined intensity value and (2) morphological or texture features in accordance with pre-determined lesion criteria.

3. The method of claim 1, wherein a first threshold value is applied to the merged regions having an average gray value lower than a pre-determined value $G_0$, and a second threshold value is applied to the merged regions having an average gray value higher than pre-determined value $G_0$.

4. The method of claim 1, further comprising the step of segmenting the selected at least one candidate lesion region in the ultrasound image.

5. The method of claim 1, wherein the step of performing a normalized cut is accomplished by segmenting spatially contiguous pixels in the filtered ultrasound image into a plurality of regions in accordance with substantially similar features.

6. The method of claim 5, wherein the normalized cut is accomplished to minimize a similarity between each of the plurality of regions and maximize a similarity within each of the plurality of regions.

7. The method of claim 6, wherein the features include intensity-based features and/or texture-based features.

8. A method for determining a candidate lesion region in a digital ultrasound medical image of anatomical tissue, the method comprising using a processor or computer to perform automatically steps of:
   accessing the digital ultrasound medical image of anatomical tissue;
   applying an anisotropic diffusion filter to the ultrasound image to generate a filtered ultrasound image;
   performing a normalized cut operation on the filtered ultrasound image to partition the filtered ultrasound image into a plurality of regions, wherein the normalized cut is performed by segmenting spatially contiguous pixels in the filtered ultrasound image into a plurality of regions in accordance with substantially similar features;
   merging the plurality of regions into merged regions based on pre-determined threshold values; and
   selecting, from the merged regions, at least one region as a candidate lesion region, wherein the selected candidate lesion region has: (1) an intensity value lower than a pre-determined intensity value and (2) morphological or texture features in accordance with pre-determined lesion criteria.

9. The method of claim 8, wherein a first threshold value is applied to the merged regions having an average gray value lower than a pre-determined value $G_0$, and a second threshold value is applied to the merged regions having an average gray value higher than pre-determined value $G_0$.

10. The method of claim 8, further comprising the step of segmenting the selected at least one candidate lesion region in the ultrasound image.

11. The method of claim 8, wherein the normalized cut is accomplished to minimize a similarity between each of the plurality of regions and maximize a similarity within each of the plurality of regions.

12. The method of claim 11, wherein the features include intensity-based features and/or texture-based features.

* * * * *